United States Patent [19]

Lombardo

[11] 4,317,404

[45] Mar. 2, 1982

[54] MUSICAL RHYTHM PATTERN GENERATOR

[76] Inventor: John Lombardo, 277 Clarks Blvd., Massapequa, N.Y. 11758

[21] Appl. No.: 133,266

[22] Filed: Mar. 24, 1980

[51] Int. Cl.[3] .......... G09B 15/02

[52] U.S. Cl. .......... 84/474; 235/78 R; 235/88 R

[58] Field of Search .......... 84/471 SR, 473, 474, 84/485 SR; 235/88-89

[56] References Cited

U.S. PATENT DOCUMENTS

| | | | |
|---|---|---|---|
| 1,792,324 | 2/1931 | Roelike | 84/474 |
| 2,427,976 | 9/1947 | Posson | 235/88 F |
| 2,512,915 | 6/1950 | Boutwell | 235/88 RC |
| 3,592,099 | 7/1971 | Gibby | 84/473 |
| 3,621,750 | 11/1971 | Leonard | 84/471 SR |
| 3,728,932 | 4/1973 | Leonard | 84/473 |
| 4,002,097 | 1/1977 | Leonard | 84/471 SR |
| 4,074,607 | 2/1978 | Bond | 84/471 SR |
| 4,128,037 | 12/1978 | Montemurro | 84/476 |

OTHER PUBLICATIONS

The Music Trades, Feb. 1972, p. 66.

*Primary Examiner*—Lawrence R. Franklin

*Attorney, Agent, or Firm*—Browdy and Neimark

[57] ABSTRACT

A hand-operated musical rhythm pattern generator includes two independently rotatable discs mounted in a holder. The discs have complementary rhythm patterns printed on the peripheries thereof, a portion of which is visible through a window in the holder. The rhythm patterns displayed may be randomly changed by rotating one or both discs any desired angular amount.

11 Claims, 4 Drawing Figures

FIG.1
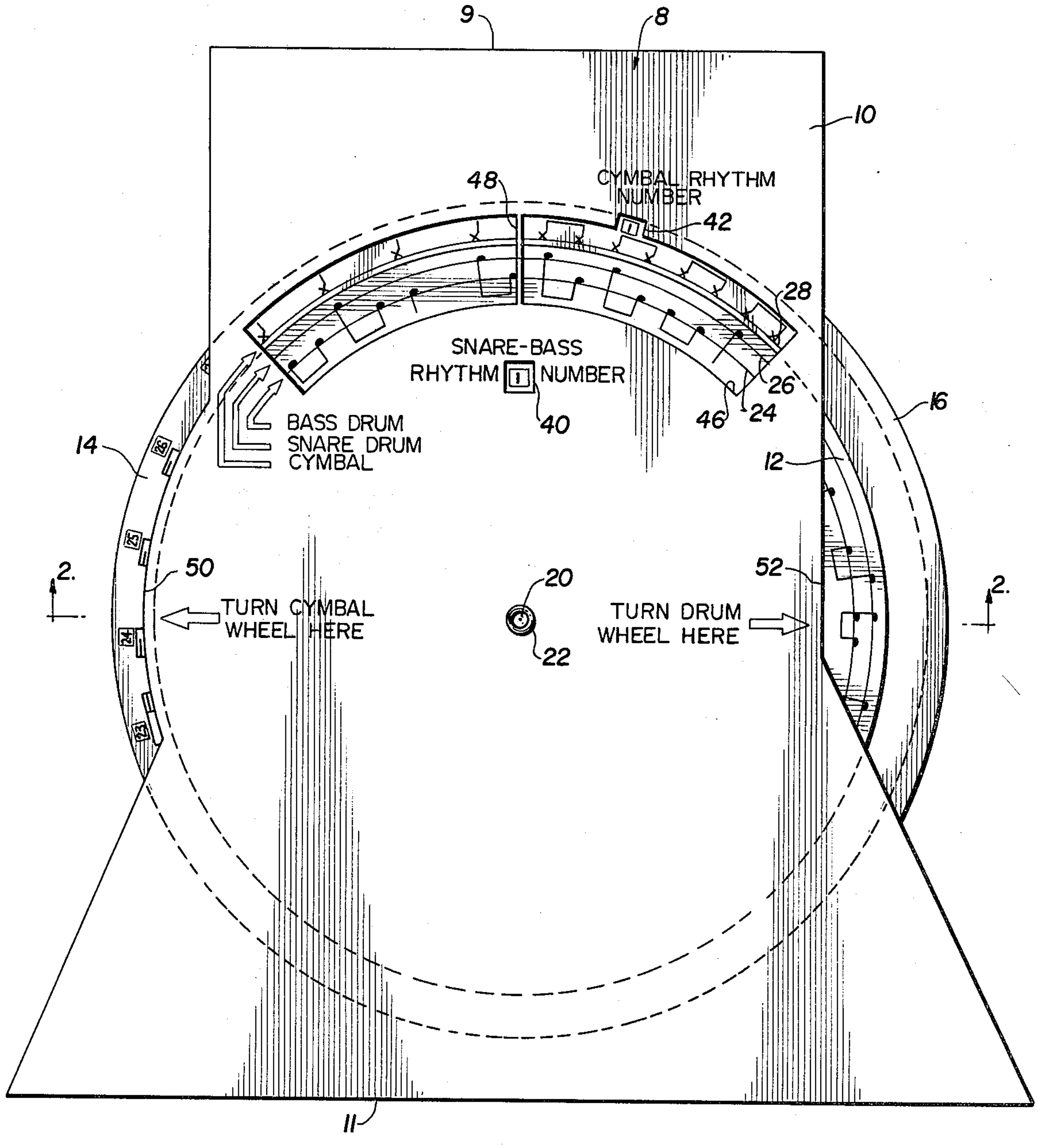
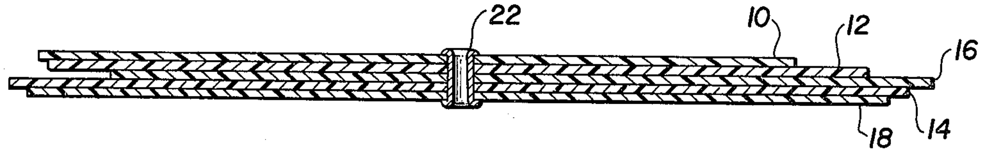
FIG.2

MUSICAL RHYTHM PATTERN GENERATOR

FIELD OF THE INVENTION

The present invention relates to a hand-operated device providing mechanical means for generating, designing, creating and/or composing musical rhythm patterns.

BACKGROUND OF THE INVENTION

Composing rhythm patterns can be a very tedious task. Available rhythm patterns may be present in textbooks, method books, handbooks, lengthy charts, etc. When selecting a rhythm pattern for a given composition, one must refer to one or more of such books or lengthy charts. This can be a rather clumsy procedure. This becomes even more difficult when rhythm patterns become more complex due to two, three or more rhythm lines. For example, when writing rhythm for a snare drum, bass drum, and cymbals, not only must the rhythm pattern of each individual instrument be considered but also the combination thereof. Thus, for each different rhythm pattern for the cymbal, there may be an infinite number of rhythm patterns for the bass drum and snare drum.

It can thus be seen that the designing of rhythm patterns can be quite complex and may require the continuous writing and modification of notes in order to eventually obtain the desired rhythm pattern.

When a percussionist desires to practice various rhythm patterns, he must either find a source having various rhythm patterns written out, or he must write them out himself beforehand and then practice playing them. It is very important for percussionists, and particularly drum set percussionists, to rehearse various rhythm patterns in order to be comfortable with the coordination between snare drum, bass drum and cymbals, and to become more comfortable in sight reading percussion rhythm patterns.

No method has previously been available for easily creating countless numbers of rhythm patterns which can be read for the purpose of practicing, or which can be read for the purpose of composing music.

SUMMARY OF THE INVENTION

Accordingly, it is an object of the present invention to eliminate the deficiencies of the prior art, such as those set forth hereinabove.

It is a further object of the present invention to provide an improvement to increase the ease of practicing and composing rhythm patterns.

It is yet another object of the present invention to provide a device for generating musical rhythm patterns.

It is still another object of the present invention to provide a hand operated device for mechanically generating musical rhythm patterns.

It is yet another object of the present invention to eliminate the need for lengthy charts which list available rhythm patterns.

It is a further object of the present invention to provide a new quick technique for developing rhythm patterns.

It is still another object of the present invention to eliminate the need for continually writing notes when designing rhythm patterns.

It is yet another object of the present invention to provide a device which makes modification of rhythm patterns quick and efficient.

It is another object of the present invention to provide a hand musical rhythm generator capable of displaying a plurality of different musical rhythm patterns on each of at least two portions of the musical staff such that each of the rhythm patterns on each of the portions of the staff can be displayed in conjunction with each of the rhythm patterns on the opposite portion of the staff.

It is still another object of the present invention to provide a hand rhythm pattern generator having two discs, the periphery of one disc having printed thereon a plurality of bass drum and snare drum rhythm patterns, and the periphery of the second disc having printed thereon a plurality of cymbal rhythm patterns, the device having a window to display a predetermined number of beats of the rhythm patterns on each disc shown in conjunction with one another.

Still other objects, features and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

FIG. 1 is a front elevation of the rhythm pattern generator of the present invention;

FIG. 2 is a sectional view thereof taken on the line 2—2 in FIG. 1;

DESCRIPTION OF PREFERRED EMBODIMENT

Figure 3:
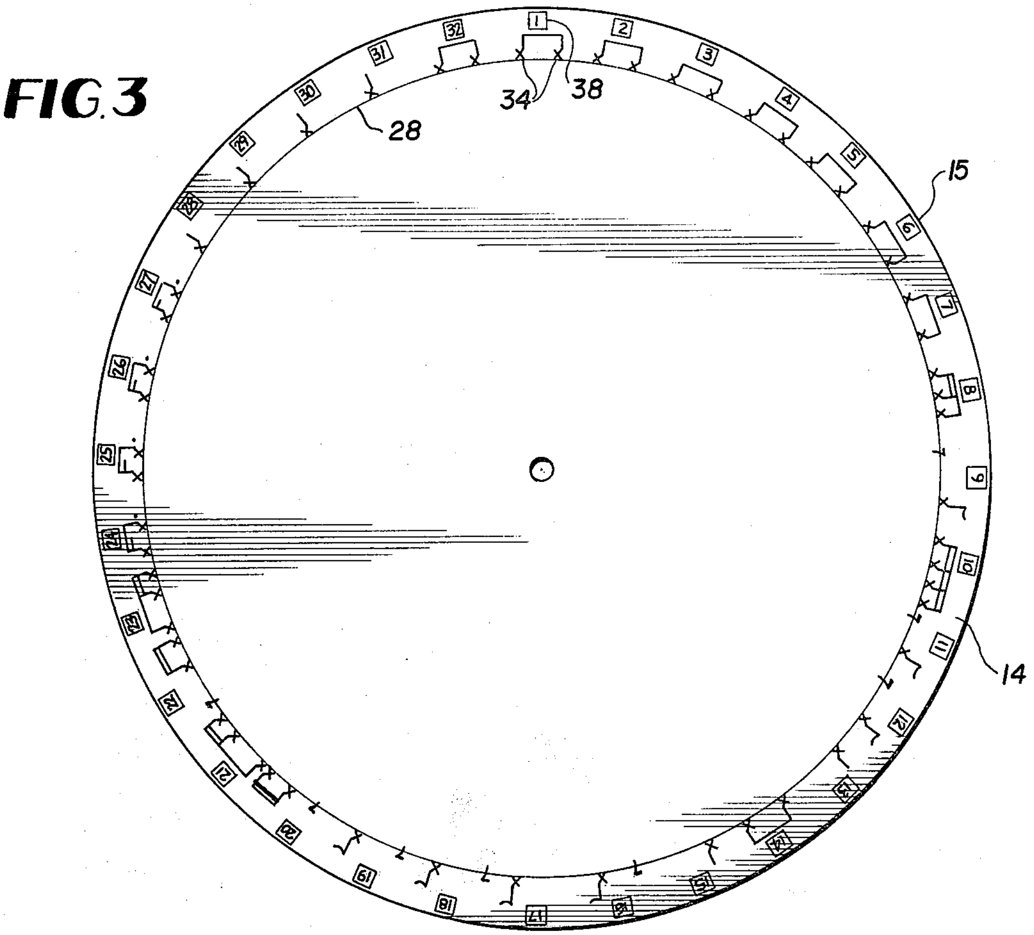
FIG. 3 is a front elevation of one of the discs used in the device of the present invention.

The presently preferred embodiment of the present invention is illustrated in the drawings as comprising a holder 8 having a front face 10 and a rear face 18 which may be connected together at the top and bottom edges 9 and 11. Between the front and rear faces 10 and 18 of the holder 8 are disposed two flat circular discs 12 and 14. Disc 14 is larger than disc 12. Discs 12 and 14 are arranged adjacent one another on a common rotational axis 20. Between the discs 12 and 14 is a stationary sheet 16 which may be connected to front and rear sheets 10 and 18 in such a manner as to permit rotatability of the discs 12 and 14. A stationary axle 22 is connected to front and rear sheets 10 and 18 of the holder 8. The discs 12 and 14 are rotatable therearound.

Holder 8 is specifically shaped in order to aid in the independent rotation of discs 12 and 14. On one side of holder 8, front and back faces 10 and 18 are cut away at 50 to expose the outer periphery of disc 14. Front face 10, however, is not cut away so far as to expose the outer peripheral edge 13 of disc 12. At this cutaway portion 50 on one side of the holder 8, the outer edge 15 of disc 14 can be easily contacted by the finger of the user to cause rotation of disc 14.

On the opposite side of holder 8, front face 10 is cut away at 52 so as to expose the outer periphery of disc 12. Between discs 12 and 14, center sheet 16 of the holder is exposed in a manner such that it totally covers and therefore hides from view disc 14 in the area of cutout 52. It can be seen that in the area of cutout 52, the outer edge 13 of disc 12 can be easily contacted by the finger of the user to cause rotation of disc 12.

Except in areas of cutouts 52 and 50, as well as the windows which will be described hereinbelow, front face 10 completely covers and hides from view both discs 12 and 14.

Figure 4:
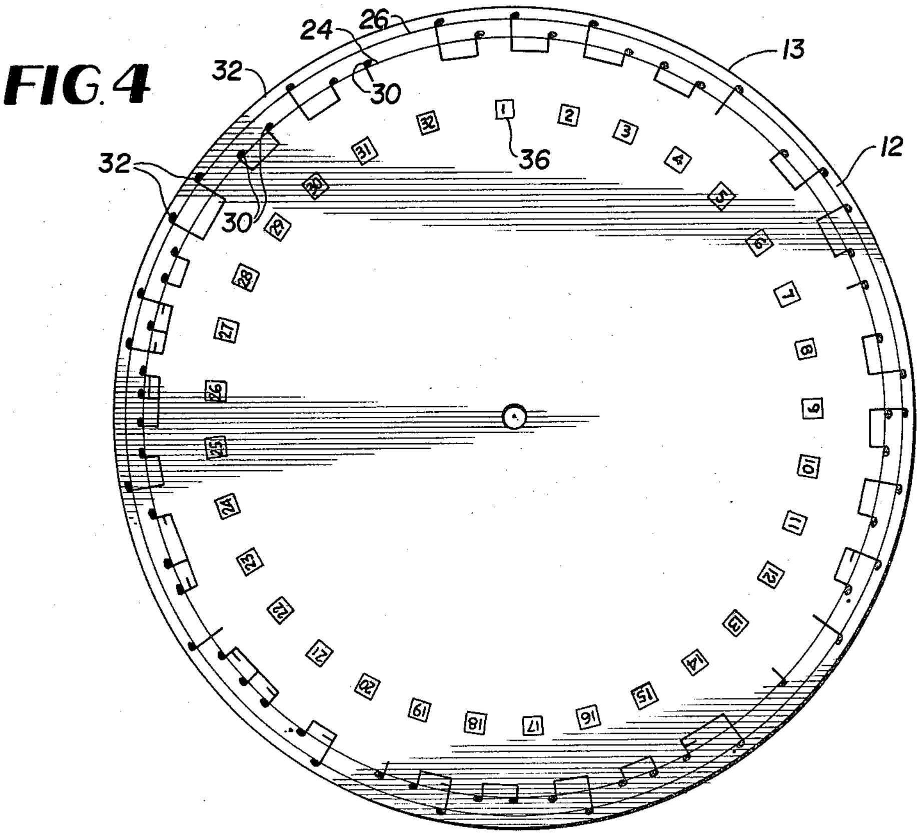
FIG. 4 is a front elevation of another of the discs used in the present invention.

Disc 14 is shown in FIG. 3 in its entirety, and disc 12 in its entirety is shown in FIG. 4. It can be seen that the outer circumference of each of the two discs 12 and 14 contain note patterns arranged on lines or spaces of the musical staff. The lines 24, 26, 28 of the musical staff are arranged in concentric circles on the outer circumference of each disc. When the two discs 12 and 14 are in operative position, the lines appear to be equidistant from one another so as to form a full five line musical staff, or a portion thereof, as a continuous circle around the superimposed discs. In the embodiment illustrated, three lines of the musical staff are shown. The bottom and middle lines 24 and 26 are printed on disc 12, and top line 28 is printed on disc 14. While the second and fourth lines of the musical staff are not illustrated, they may be added if desired.

In accordance with conventional percussion notation, bass drum notes are written on the first space of the staff and snare drum notes are written on the third space of the staff. Notes for the cymbals may be written on the space above the fifth line of the staff. In accordance with this conventional notation, in the embodiment illustrated it can be seen that bass drum notes 30 in the rhythm patterns are illustrated on the space above line 24, and snare drum notes 32 are written on the space above line 26 on disc 12. The cymbal notes 34 are written on the space above line 28 on disc 14.

Note patterns for the snare drum, bass drum and cymbals are written on the staff lines around the entire outer periphery of discs 12 and 14. The rhythm patterns indicated by these notes can be of a very large number of different types. The rhythm patterns are arranged such that a predetermined number of beats are present for every predetermined length of arc of the circumference. For example, discs 12 and 14 have four beats (equivalent to four quarter notes) for every 45° of arc. Thus, all the notes making up one beat of rhythm are preferably placed within $11\frac{1}{4}°$ of arc on the circumference of the disc. Depending on the particular rhythm pattern being written, this single beat appearing in the $11\frac{1}{4}°$ of arc may be a single quarter note, two eighth notes, four sixteenth notes, a combination of eighth and sixteenth notes making up one beat, etc.

On the front face 10 of the holder is placed a window 46. The window 46 is in the shape of an arc of a circle concentric with discs 12 and 14. The window is located in the vicinity of the muscial staff lines 24,26, 28 and notes 30, 32, 34 written on the circumference of discs 12 and 14. Window 46 has a radial width sufficient to display the notes printed on both discs 12 and 14 but not so wide as to show the extreme outer edge 15 of larger disc 14.

In the illustrated embodiment, the length of the arc of window 46 is such as to expose eight beats (90° of arc). A bar 48, non-rotatably connected to front face 10 of the holder 8, bisects the arc of the window 46 and thus divides it into two portions of four beats each (45°), thereby creating a display of two measures of music in four-four time.

Front cover 10 of the holder 8 further has cut out therefrom two small windows 40 and 42. Window 40 is located between window 46 and axle 22, preferably near the bottom of window 46. Disc 12 has a plurality of numbers written thereon along the circumference of a circle of a radius equal to the distance between axle 22 and window 40. The numbers are of a size which can be displayed through window 40. Thus, as disc 12 is rotated about axis 20, each of the numbers 36 sequentially come into view through window 40.

Window 42 is cut out from front face 10 of the holder 8 on the side of window 46 distal from axle 22. Window 42 is positioned so as to display thereunder a portion of the periphery of disc 14 between notes 34 and the outer edge 15 of disc 14. In the illustrated embodiment window 42 is an extension of window 46.

Disc 14 further has printed thereon a plurality of numbers 38 along the circumference of a circle having a diameter equal to the distance between axis 20 and window 42. The numbers are of a size which can be displayed through window 42. Thus, in a manner similar to window 40 and numbers 36, the numbers 38 sequentially come into view within window 42 as disc 14 is rotated about its axis.

The distance between adjacent numbers 36 on disc 12 and adjacent numbers 38 on disc 14 is set such that a predetermined number of beats or portions of a beat will pass in window 46 as the discs 12 and 14 are rotated from one number to another. In the illustrated embodiment, passing from one number to the adjacent number in either windows 40 or 42 causes the discs 12 or 14 to shift one beat or $11\frac{1}{4}°$. The numbers 36, 38 are aligned with respect to the notes 30, 32, 34 on the respective discs 12, 14 such that when the disc 12 is aligned such that a number 36 is centered in window 40, exactly eight beats will be displayed in window 46 with four beats displayed to the left side of bar 48, and four beats displayed on the right side thereof. The same is true with respect to numbers 38, window 42, and notes 34 on disc 14.

The number 36 displayed in window 40, is denominated the "snare-bass rhythm number". Since there is a substantial variation in the rhythm patterns throughout the circumference of discs 12 and 14, each snare-bass rhythm number 36 will cause a new two-measure rhythm pattern to be exposed in window 46. The number 38 exposed in window 42 is denominated the "cymbal rhythm number". Each cymbal rhythm number 38 also causes a new two-measure cymbal rhythm pattern to be exposed in window 46.

It can readily be seen that the discs 12 and 14 may be independently rotated to display any given cymbal rhythm number 38 in opposition to any given snare-bass rhythm number 36. Therefore, by rotating either or both discs 12, 14 to any given number 36, 38, a new note or notes are exposed and a new rhythm pattern is generated and exposed. It can readily be seen that a total of 1,024 (32×32) rhythm patterns can be easily and quickly generated by means of the illustrated embodiment of the present invention.

It should be understood that while one embodiment of the present invention has been illustrated, it is not intended that the present invention be limited thereto. For example, while the illustrated embodiment shows four beats for every 45° of arc, a musical rhythm pattern generator in accordance with the present invention can be designed having any given number of beats in each predetermined length of arc, limited only by the size of the device and the legibility of the notes thereon. Similarly, while the arc of window 46 in the illustrated device exposes eight beats or two measures, the length of arc of window 46 may be selected to expose any predetermined number of beats. Furthermore, window 46 may be designed to have a variable arc length so that the number of beats per measure can be manually set. To vary the arc length of window 46, slidable shutters (not shown) can be placed behind front face 10 of holder 8.

Furthermore, while the illustrated embodiment shows one rhythm number in windows 40 and 42 for every beat of the rhythm patterns, the distance between rhythm numbers may clearly be varied to allow a change of more or less than one beat between rhythm numbers.

It should further be understood that while two discs are shown, the device could easily be designed to have three or more discs. For example, the bass drum line could be on a separate disc from the snare drum line, thereby allowing the bass drum beat to be independently set from both the cymbal and snare drum rhythm patterns. This would allow an even greater number of rhythm patterns to be generated and exposed. Further discs for other rhythm lines, such as the hi hat cymbal, may also be present.

While the illustrated embodiment is specifically directed toward rhythm patterns for bass drum, snare drum and cymbal, for particular use by a drum set percussionist, similar musical rhythm pattern generators may be devised for use by any instrument or group of instruments in which varied rhythm patterns are desirable.

The holder 8 and discs 12, 14, may conveniently be made of any suitable material including, but not limited to paper, cardboard, plastic, metal, etc. The windows 46, 40 and 42 may be apertures in the holder 8 or may be transparent portions thereof.

It will be obvious to those skilled in the art that various other changes and modifications may be made without departing from the scope of the invention and the invention is not to be considered limited to what is shown in the drawings and described in the specification.

What is claimed is:

1. A musical rhythm pattern generator, comprising:

a holder having a front face;

a first disc rotatably mounted with respect to said holder behind the front face thereof;

a second disc rotatably mounted with respect to said holder behind said first disc so as to be independently rotatable with respect to said first disc about a common axis, said second disc having a larger diameter than said first disc;

a first plurality of different musical rhythmic note patterns provided in a first circle on the face of said first disc facing said front face of said holder, said first circle of rhythmic note patterns being disposed near the periphery of said first disc; and a second plurality of different musical rhythmic note patterns provided in a second circle on the face of said second disc facing said first disc, said second circle of rhythmic note patterns being centered on the axis of said second disc and having a diameter greater than the diameter of said first disc;

wherein said first and second rhythmic note patterns are so disposed in their respective circles on said first and second discs such that each arc segment of predetermined fixed angular measurement of said circles of note patterns corresponds to a given constant musical time interval, the time value of any rhythmic note pattern combination within said predetermined arc segment equaling said musical time interval regardless of the number of musical symbols necessary to total said given musical time interval, and wherein said front face of said holder has a first window therein in the vicinity of the outer periphery of said first disc, said first window being shaped such that a portion of said concentric first and second rhythmic note pattern circles are visible therethrough.

2. A musical rhythm pattern generator in accordance with claim 1, wherein said first rhythmic note patterns are written in percussion notation and include rhythmic patterns for bass drum and snare drum, and said second rhythmic note patterns are written in percussion notation and include rhythmic patterns for cymbal.

3. A musical rhythm pattern generator in accordance with claim 1, wherein each of said first and second plurality of rhythmic note patterns include at least one line of the musical staff thereon and wherein said first and second circles of note patterns form at least a portion of a full five-line musical staff with equal distances between adjacent lines thereof.

4. A musical rhythm pattern generator in accordance with claim 1, further including:

a first circle of consecutive alphanumeric symbols provided on said first disc concentric with, and having a diameter smaller than, said first circle of rhythmic note patterns; and said front face of said holder has a second window therein of such location as to be aligned with said first circle of alphanumeric symbols and of such size as to display one of said symbols at a time;

wherein said first circle of alphanumeric symbols is aligned with respect to said first circle of rhythmic note patterns such that when a symbol is displayed in said second window an exact predetermined musical time interval of said first rhythmic note pattern is displayed in said first window, and rotating said first disc an angular measurement sufficient to move the display in said second window from one symbol to the next consecutive symbol causes an exact predetermined musical time interval, to pass through said first window.

5. A musical rhythm pattern generator in accordance with claim 4, further including:

a second circle of consecutive alphanumeric symbols provided on said second disc concentric with, and having a diameter smaller than, said second circle of rhythmic note patterns; and said front face of said holder has a third window therein of such location as to be aligned with said second circle of alphanumeric symbols and of such size as to display one of said symbols at a time;

wherein said second circle of alphanumeric symbols is aligned with respect to said second circle of rhythmic note patterns such that when a symbol is displayed in said third window an exact predetermined musical time interval of said first rhythmic note pattern is displayed in said first window, and rotating said second disc an angular measurement sufficient to move the display in said third window from one symbol to the next consecutive symbol causes an exact predetermined musical time interval to pass through said first window.

6. A musical rhythm pattern generator in accordance with claim 5, wherein the angular measurement between alphanumeric symbols in said first and second circles thereof is equal to the arc of angular measurement corresponding to one beat in said first and second rhythmic note pattern circles.

7. A musical rhythm pattern generator in accordance with claim 1, wherein the front face of said holder is shaped such that at one side thereof the outer periphery of said second disc is exposed but the outer peripheral edge of said smaller first disc is not exposed, and the other side of said front face of said holder is shaped such that the outer periphery of said first disc is exposed.

8. A musical rhythm pattern generator in accordance with claim 7, wherein said holder further includes a center sheet disposed between said first and second discs, fixedly mounted with respect to said front face of said holder, said center sheet being shaped so as to completely cover said second disc in the area of the side of said front face exposing said first disc.

9. A musical rhythm pattern generator in accordance with claim 1, wherein said first window is in the shape of an arc concentric with said first and second circles of rhythmic note patterns.

10. A musical rhythm pattern generator in accordance with claim 9, wherein said first window has at least one radial bar therein, fixedly mounted with respect to the front face of said holder, dividing said first window into sections of equal angular measurement.

11. A musical rhythm pattern generator in accordance with claim 10, wherein the angular measurement of the arc of said first window equals that angular measurement corresponding to eight beats of said rhythm patterns and said bar bisects the arc of said first window, whereby two four-beat measures of rhythmic patterns are exposed therethrough.

* * * * *